C. W. PACKER.
DASHERS FOR ICE-CREAM FREEZERS.
No. 172,475. Patented Jan. 18, 1876.
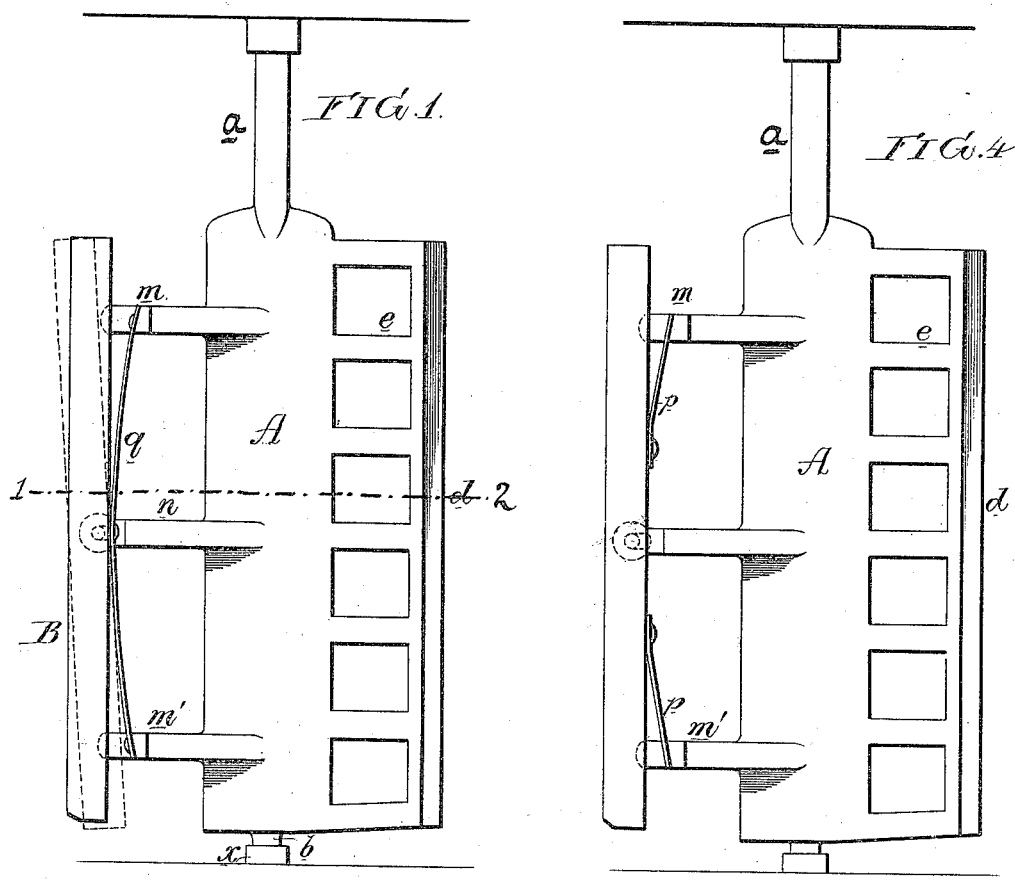
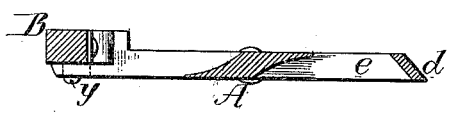

UNITED STATES PATENT OFFICE.

CHARLES W. PACKER, OF PHILADELPHIA, PENNSYLVANIA.

IMPROVEMENT IN DASHERS FOR ICE-CREAM FREEZERS.

Specification forming part of Letters Patent No. 172,475, dated January 18, 1876; application filed December 12, 1874.

*To all whom it may concern:*

Be it known that I, CHARLES W. PACKER, of Philadelphia, Pennsylvania, have invented a certain Improvement in Ice-Cream Freezers, of which the following is a specification:

My invention relates to an improvement in the dasher of the ice-cream freezer for which Letters Patent were granted to me on the 23d day of July, A. D. 1867; and the object of my invention is to so connect the scraping-bar to the dasher of my said patented ice-cream freezer that it will accommodate itself more accurately to the can containing the cream than the bar in my former patent. This object I attain in the manner I will now proceed to describe, reference being had to the accompanying drawing, in which—

Figure 1 is a front view of the dasher with my improvement; Fig. 2, a sectional plan on the line 1 2, Fig. 1; Fig. 3, part of the dasher, and Fig. 4 a modification of my invention.

The dasher consists of a bar, A, of the sectional form shown in Fig. 2, and has an upper journal, $a$, which is adapted to a bearing in the lid of the can, and a lower journal, $b$, adapted to a step, $x$, on the bottom of the can containing the cream, an inclined vane, $d$, being connected to the bar A by a series of arms, $e$. From this bar A of the dasher project the three arms $m$, $m'$, and $n$, the central arm $n$ having an elongated opening, $t$, through which passes the pin $y$, for connecting the wooden scraping-bar B to the said arm, so that the bar cannot only vibrate on the arm $n$, but move to and fro on the same from or toward the central bar A of the dasher. A spring, $q$, attached at its opposite ends to the arms $m$ $m'$, bears against the inner edge of the scraping-bar, and tends to force the outer edge of the same against the inside of the can containing the cream.

The above-described dasher is similar to that in my said patent, with this exception, that in the latter the dasher is arranged to vibrate on a fixed pin, whereas in my present improvement the pivot-pin can yield as well as vibrate, and hence can accommodate itself to the inside of the can from which it has to scrape the frozen cream more thoroughly than the scraper described in the said patent.

In the modification shown in Fig. 4 two springs, $p$ $p$, are connected to the scraping-bar, one spring bearing against a shoulder on one arm, $m$, and the other spring on the other shoulder, $m'$. In both cases the rigid arm $n$ effectually resists the vertical strain to which the scraping-bar is subjected by the occasional lifting of the dasher.

I wish it to be understood that I do not claim, broadly, a spring scraping-bar arranged to both slide and vibrate freely on the dasher; but

I claim as my invention—

The combination of the dasher of an ice-cream freezer and its arm $n$, having a longitudinal slot, $t$, with the spring $q$ and the scraper B, connected to the dasher by a pin entering the slot in said arm, all as set forth.

In testimony whereof I have signed my name to this specification in the presence of two subscribing witnesses.

CHAS. W. PACKER.

Witnesses:
HUBERT HOWSON,
HARRY SMITH.